United States Patent
Wang et al.

(10) Patent No.: US 6,348,873 B1
(45) Date of Patent: Feb. 19, 2002

(54) APPARATUS AND METHOD FOR USER-MEDIATED CONTROL OF CPU TEMPERATURE IN NOTEBOOK COMPUTERS

(75) Inventors: Yun Song Wang, Tienchin (CN); Tong S Chen; Kuang Shin Lin, both of Taipei (TW)

(73) Assignee: Inventec Corporation (TW)

( * ) Notice: Subject to any disclaimer, the term of this patent is extended or adjusted under 35 U.S.C. 154(b) by 0 days.

(21) Appl. No.: 09/740,828

(22) Filed: Dec. 21, 2000

(51) Int. Cl.⁷ .............................................. G08B 21/00
(52) U.S. Cl. ...................... 340/635; 702/130; 702/132; 364/528.34; 364/528.35; 700/299; 700/300; 361/695; 361/704
(58) Field of Search ................................ 340/635, 640, 340/643, 584; 702/130, 132; 264/528.34, 528.35; 700/299, 300; 361/689, 690, 695, 704

(56) References Cited

U.S. PATENT DOCUMENTS

| 5,428,503 A | * | 6/1995 | Matsushima et al. | 361/695 |
| 5,726,911 A | * | 3/1998 | Canada et al. | 702/32 |
| 6,034,871 A | * | 3/2000 | Cheng | 361/695 |
| 6,226,180 B1 | * | 5/2001 | Ueda et al. | 361/689 |
| 6,269,003 B1 | * | 7/2001 | Wen-Chen | 361/704 |

* cited by examiner

*Primary Examiner*—Edward Lefkowitz

(57) ABSTRACT

An apparatus and method for user-mediated control of CPU temperature in a notebook computer, wherein the notebook computer has a fan controller module and a fan, comprises: (1) a setting module that sets a warning temperature value; (2) a monitoring module that monitors current CPU temperature and actuates a temperature adjustment module when temperature adjustment is necessary; and (3) a temperature adjustment module that actuates the notebook computer's fan controller module to calculate a fan speed required for temperature adjustment, and switches the fan to that speed.

8 Claims, 3 Drawing Sheets

APPARATUS AND METHOD FOR USER-MEDIATED CONTROL OF CPU TEMPERATURE IN NOTEBOOK COMPUTERS

BACKGROUND OF THE INVENTION

1. Field of the Invention

The present invention relates to control of CPU temperature in notebook computers, and more particularly to an apparatus and method for user-mediated control of CPU temperature in notebook computers.

2. Background and Prior Art

As the power consumption of IC computer components and assemblies such as CPUs and chipsets increases, so does the demand for effective heat dispersion from computer equipment. This demand is especially critical in notebook computer equipment, where the heat generated by compact arrays of IC components, if not effectively removed, can easily cause unstable performance, failure, and permanent damage.

CPU temperature control in conventional notebook computers is a function of the BIOS (basic input/output system). For that reason, the CPU temperature control parameters can only be accessed during computer startup, and cannot generally be changed during subsequent operation of the computer. It is thus impossible for the user to respond to environmental changes or special temperature constraints that arise during continued operation of the computer.

SUMMARY OF THE INVENTION

The object of the present invention is to solve the above-mentioned problems and to provide a means for operator mediation of CPU temperature control in a notebook computer during continuing operation of the computer.

The present invention, a means for user-mediated control of CPU temperature in a notebook computer, wherein the notebook computer has a fan controller module and a fan, comprises: (1) a setting module for setting a warning temperature value; (2) a monitoring module for monitoring current CPU temperature and actuating a temperature adjustment module when temperature adjustment is necessary; and (3) a temperature adjustment module for actuating the notebook computer's fan controller module to calculate a fan speed required for temperature adjustment, and for switching the fan to that speed.

BRIEF DESCRIPTION OF THE DRAWINGS

The present invention will be described in detail with reference to the illustrated embodiment and the accompanying drawings, in which.

DETAILED DESCRIPTION OF THE PREFERRED EMBODIMENT

An apparatus and method for user-mediated control of CPU temperature in a notebook computer according to the preferred embodiment of the present invention, wherein the notebook computer has a fan controller module and a fan, comprises: (1) a setting module for setting a warning value for CPU temperature; (2) a monitoring module for monitoring and recording current CPU temperature; and (3) a temperature adjustment module, for comparing current CPU temperature with the current warning temperature, then utilizing the notebook computer's fan controller module to calculate a new fan speed and switching the fan to that speed. Detailed description of each of the three modules follows.

Figure 1:
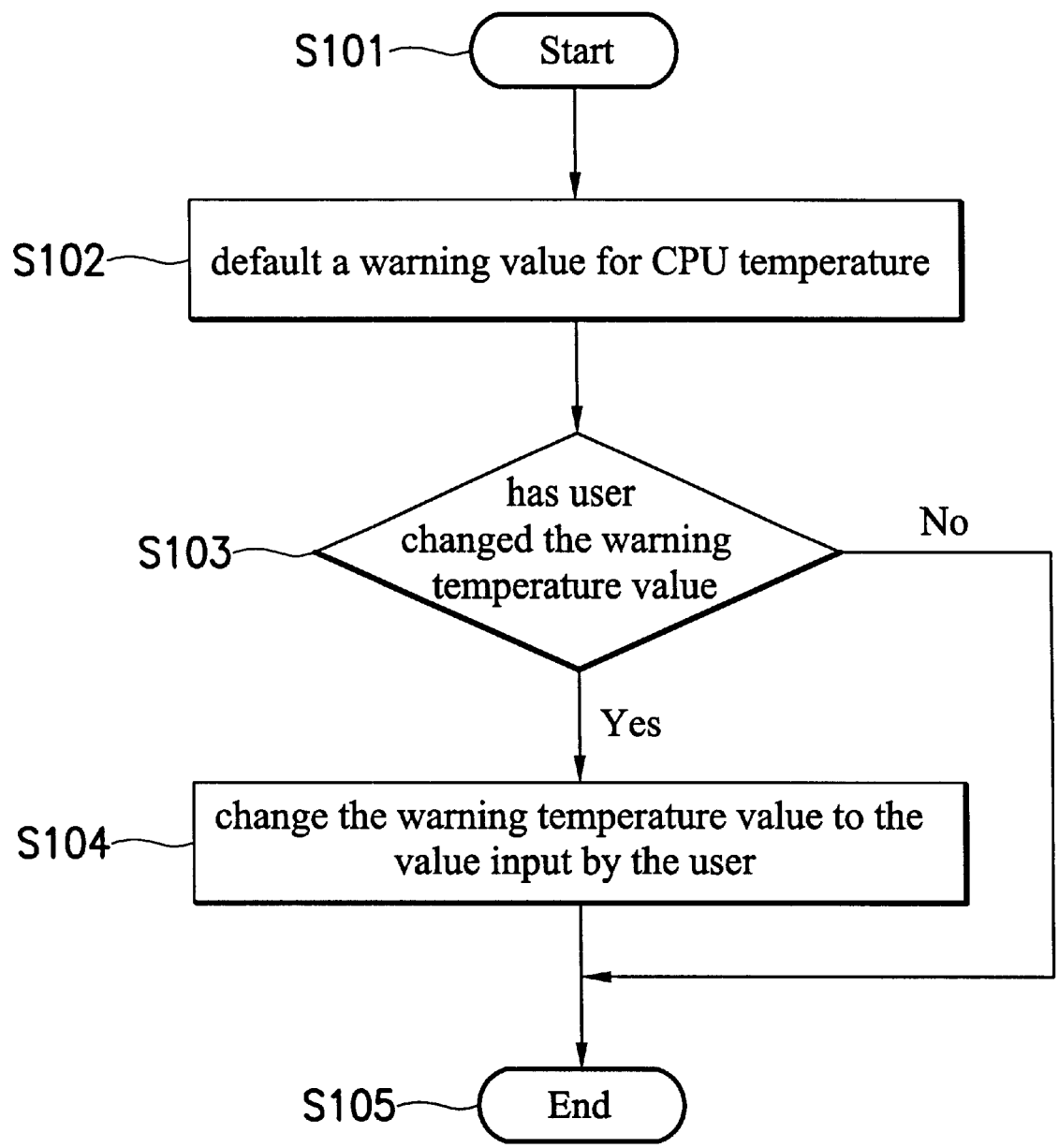
FIG. 1 is a flow chart showing the sequence of steps performed by the setting module.

FIG. 1 is a flow chart showing the sequence of steps performed by the setting module. In Step S102 the setting module reads a warning temperature value input by the user. If the user has not input a warning temperature value, then the warning value remains at its default value, such as 70°.

In step S103, the warning temperature is compared with current user input value. If the current user input value for warning temperature is different from current warning temperature, then the warning temperature value is changed to the user input value in step S104 before termination of the setting module in step S105.

Figure 2:
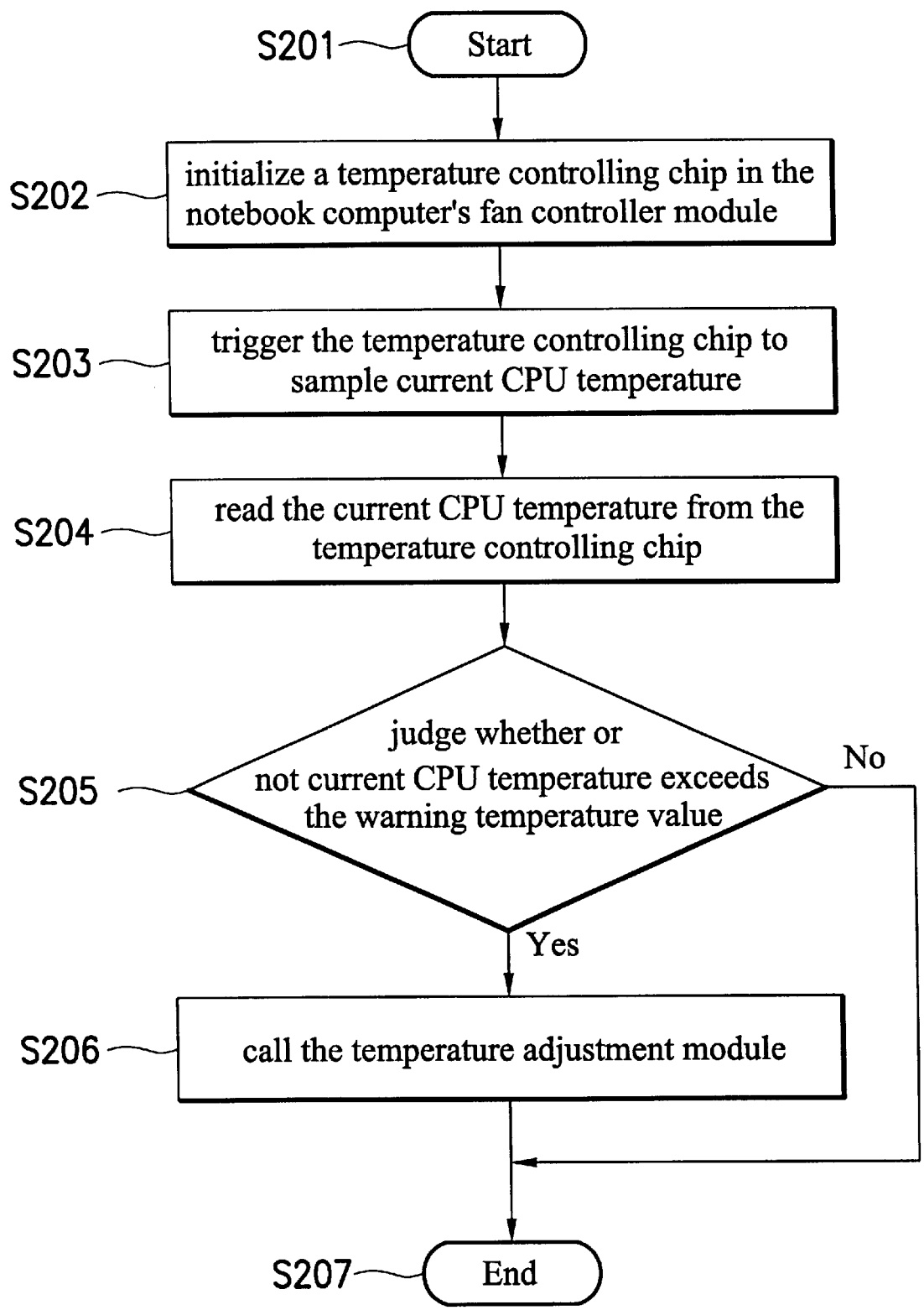
FIG. 2 is a flow chart showing the steps performed by the monitoring module.

FIG. 2 is a flow chart showing the steps performed by the monitoring module. In step S202, the monitoring module initializes a temperature controlling chip, such as SMC951, in the fan controller module of the notebook computer.

In step S203, the monitoring module triggers the temperature controlling chip to sample current CPU temperature.

In step S204, the monitoring module reads the current CPU temperature from the temperature controlling chip.

In step S205, the monitoring module compares current CPU temperature with the warning temperature value. If current CPU temperature exceeds the warning temperature value, the monitoring module will execute step S206 before terminating in step S207.

In step S206, the monitoring module calls the temperature adjustment module.

Figure 3:
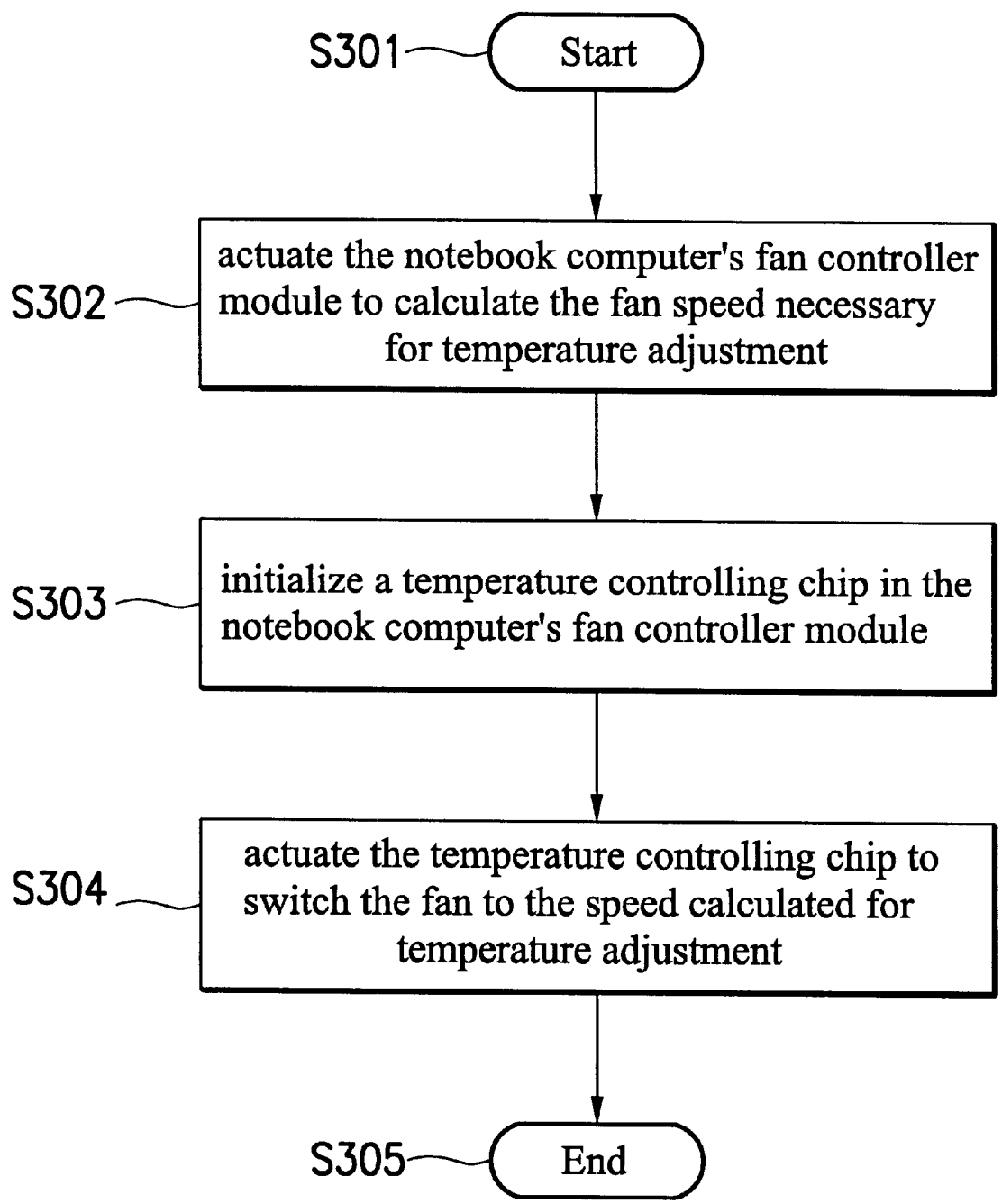
FIG. 3 is a flow chart showing the steps performed by the temperature adjustment module.

FIG. 3 is a flow chart showing the steps performed by the temperature adjustment module. In step S302, the temperature adjustment module actuates the notebook computer's fan controller module to calculate the fan speed necessary for temperature adjustment.

In step S303, the adjusting temperature module initializes a temperature controlling chip, such as SMC951, of the notebook computer.

In step S304, the temperature adjustment module actuates the temperature controlling chip to switch the fan to the speed calculated for temperature adjustment.

In step S305, the adjusting temperature module terminates.

After initial execution of the three modules, they remain resident and continue to accept user inputs for warning temperature and to monitor and adjust CPU temperature accordingly. When CPU temperature is too high, fan speed is automatically increased to lower CPU temperature. Thus, CPU temperature is governed by warning temperature inputs that may be provided by the user at any time during computer operations according to varying conditions, environmental changes, or other special requirements. This is accomplished with simple TSR (terminate and stay resident) software, and provides improved reliability and durability of notebook computers operated in special environments.

While the invention has been described with reference to various illustrative embodiments, the description is not intended to be construed in a limiting sense. Various modifications of the illustrative embodiments, as well as other embodiments of the invention, will be apparent to those persons skilled in the art upon reference to this description. It is therefore contemplated that the appended claims will cover any such modifications or embodiments as may fall within the scope of the invention defined by the following claims and their equivalents.

What is claimed is:

1. An apparatus for user-mediated control of CPU temperature in a notebook computer having a CPU cooling fan and fan controller module, said apparatus comprising:

a setting module for setting a warning temperature value;

a monitoring module for measuring and recording current CPU temperature; and a temperature adjustment module, which compares the current CPU temperature with the warning temperature, utilizes the notebook computer's fan controller module to calculate an appropriate fan speed, and switches the CPU cooling fan to that speed.

2. The apparatus of claim 1, wherein said setting module further comprises the steps of:

providing a default warning temperature value;

determining whether the user has entered new warning temperature data; and changing the warning temperature value to equal such new warning temperature data.

3. The apparatus of claim 1, wherein said monitoring module further comprises the steps of:

initializing a temperature controlling chip in the notebook computer's fan controller module;

reading the current CPU temperature from the said temperature controlling chip;

comparing current CPU temperature with the warning temperature value; and if current CPU temperature exceeds the warning temperature value calling the temperature adjustment module.

4. The apparatus of claim 1, wherein said temperature adjustment module further comprises the steps of:

actuating the notebook computer's fan controller module to calculate the fan speed necessary for temperature adjustment;

initializing a temperature controlling chip in the notebook computer's fan controller module; and actuating the temperature controlling chip to switch the fan to the said speed calculated as necessary for temperature adjustment.

5. A method for user-mediated control of CPU temperature in a notebook computer having a CPU cooling fan and fan controller module, comprising the steps of:

setting a warning temperature value;

measuring and recording current CPU temperature; and comparing the current CPU temperature with the warning temperature;

utilizing the notebook computer's fan controller module to calculate an appropriate fan speed, and switching the CPU cooling fan to that speed.

6. The method of claim 5, wherein the step of setting the warning temperature value further comprises the steps of:

providing a default warning temperature value;

determining whether the user has entered new warning temperature data; and changing the warning temperature value to equal such new warning temperature data.

7. The method of claim 5, wherein the step of measuring and recording current CPU temperature further comprises the steps of:

initializing a temperature controlling chip in the notebook computer's fan controller module;

reading the current CPU temperature from the said temperature controlling chip;

comparing current CPU temperature with the warning temperature value; and if current CPU temperature exceeds the warning temperature value calling the temperature adjustment module.

8. The method as recited in claim 5, wherein the step of adjusting said CPU temperature further comprises the steps of:

actuating the notebook computer's fan controller module to calculate the fan speed necessary for temperature adjustment;

initializing a temperature controlling chip in the notebook computer's fan controller module; and actuating the temperature controlling chip to switch the fan to the said speed calculated as necessary for temperature adjustment.

* * * * *